(12) United States Patent
Covizzi et al.

(10) Patent No.: US 10,350,627 B2
(45) Date of Patent: Jul. 16, 2019

(54) PAINTING BOOTHS WITH CHANGE FILTER SYSTEMS

(71) Applicant: GEICO S.p.A., Cinisello Balsamo (IT)

(72) Inventors: Giampaolo Covizzi, Cinisello Balsamo (IT); Paolo Colombaroli, Cinisello Balsamo (IT)

(73) Assignee: GEICO S.P.A. (IT)

( * ) Notice: Subject to any disclaimer, the term of this patent is extended or adjusted under 35 U.S.C. 154(b) by 0 days.

(21) Appl. No.: 15/754,018

(22) PCT Filed: Sep. 1, 2016

(86) PCT No.: PCT/IB2016/055226
§ 371 (c)(1),
(2) Date: Feb. 21, 2018

(87) PCT Pub. No.: WO2017/037644
PCT Pub. Date: Mar. 9, 2017

(65) Prior Publication Data
US 2018/0236476 A1    Aug. 23, 2018

(30) Foreign Application Priority Data
Sep. 1, 2015    (IT) .......................... 102015000047636

(51) Int. Cl.
*B05B 14/43*    (2018.01)
*B01D 46/00*    (2006.01)

(52) U.S. Cl.
CPC .......... *B05B 14/43* (2018.02); *B01D 46/0006* (2013.01); *B01D 46/0002* (2013.01)

(58) Field of Classification Search
None
See application file for complete search history.

(56) References Cited

U.S. PATENT DOCUMENTS 5,039,313 A * 8/1991 Gocht ...................... B03C 3/16
                                                                    95/65
5,487,766 A * 1/1996 Vannier .............. B01D 46/0005
                                                                  454/64
(Continued)

FOREIGN PATENT DOCUMENTS

DE        202014103177 U1    8/2014

OTHER PUBLICATIONS

International Search Report and Written Opinion dated Nov. 15, 2016, in PCT Application No. PCT/IB2016/055226, 8 pages.

(Continued)

*Primary Examiner* — Jethro M. Pence
(74) *Attorney, Agent, or Firm* — MH2 Technology Law Group LLP

(57) ABSTRACT

A paint-spraying booth may include: a paint-spraying chamber; at least one filter unit; and/or a rail system. Paint may be sprayed in the paint-spraying chamber. The paint-spraying chamber may be provided with air flow for evacuation of paint overspray which may be conveyed to the at least one filter unit of the paint-spraying booth for filtering and separation of the paint overspray from the air flow. The at least one filter unit may include a plurality of replaceable filter modules. Each filter module may be removably contained inside a housing in the at least one filter unit. The rail system may be configured to remove and transport each filter module between a housing of the at least one filter unit and a zone for entry/exit of the filter modules into/from the paint-spraying booth.

20 Claims, 3 Drawing Sheets

(56) References Cited

U.S. PATENT DOCUMENTS 5,591,240 A * 1/1997 Ophardt ............ B01D 46/0058
 96/407
2016/0288036 A1 10/2016 Wieland et al.

OTHER PUBLICATIONS

International Search Report and Written Opinion dated Nov. 15, 2016, in PCT Application No. PCT/IB2016/055225, 7 pages.

* cited by examiner

PAINTING BOOTHS WITH CHANGE FILTER SYSTEMS

CROSS-REFERENCE TO RELATED APPLICATION(S)

This application is a national stage entry from International Application No. PCT/IB2016/055226, filed on Sep. 1, 2016, in the Receiving Office ("RO/IB") of the World Intellectual Property Organization ("WIPO"), published as International Publication No. WO 2017/037644 A1 on Mar. 9, 2017, and claims priority under 35 U.S.C. § 119 from Italian Patent Application No. 102015000047636, filed on Sep. 1, 2015, in the Italian Patent and Trademark Office, the entire contents of all of which are incorporated herein by reference.

The present invention relates to a paint-spraying booth provided with a system for changing the filters for eliminating the overspray.

Usually the paint-spraying booths are provided with an air flow which passes through the working zone so as to convey the overspray, namely the nebulized excess paint, outside of the booth. The air drawn in with the overspray must be necessarily purified of the paint before it can be released into the environment or introduced back into the booth and for this reason the air flow is made to pass through suitable filtering systems.

The systems which use filters become clogged as they get filled with paint and must be regularly replaced. This often results in the booth being non-operative for a considerable period of time. Moreover, the filter changing operations may be complex and difficult for the maintenance personnel who are often obliged to work in "contaminated" zones.

The general object of the present invention is to provide a booth with a filtering system having means for facilitating replacement of the overspray elimination filters.

In view of this object, the idea which has occurred, according to invention, is to provide a paint-spraying booth comprising a paint-spraying chamber inside which the paint is sprayed and which is provided with an air flow for evacuation of the overspray which is conveyed to at least one filter unit of the booth for filtering and separation of the paint overspray from the air flow, the filter unit comprising a plurality of replaceable filter modules, each filter module being removably contained inside a housing in the filter unit, characterized in that it comprises a rail system for removing and transporting each filter module of the plurality between its housing and a zone for entry/exit of the filter modules into/from the booth.

In order to illustrate more clearly the innovative principles of the present invention and its advantages compared to the prior art, an example of embodiment applying these principles will be described below with the aid of the accompanying drawings. In the drawings.

Figure 1:
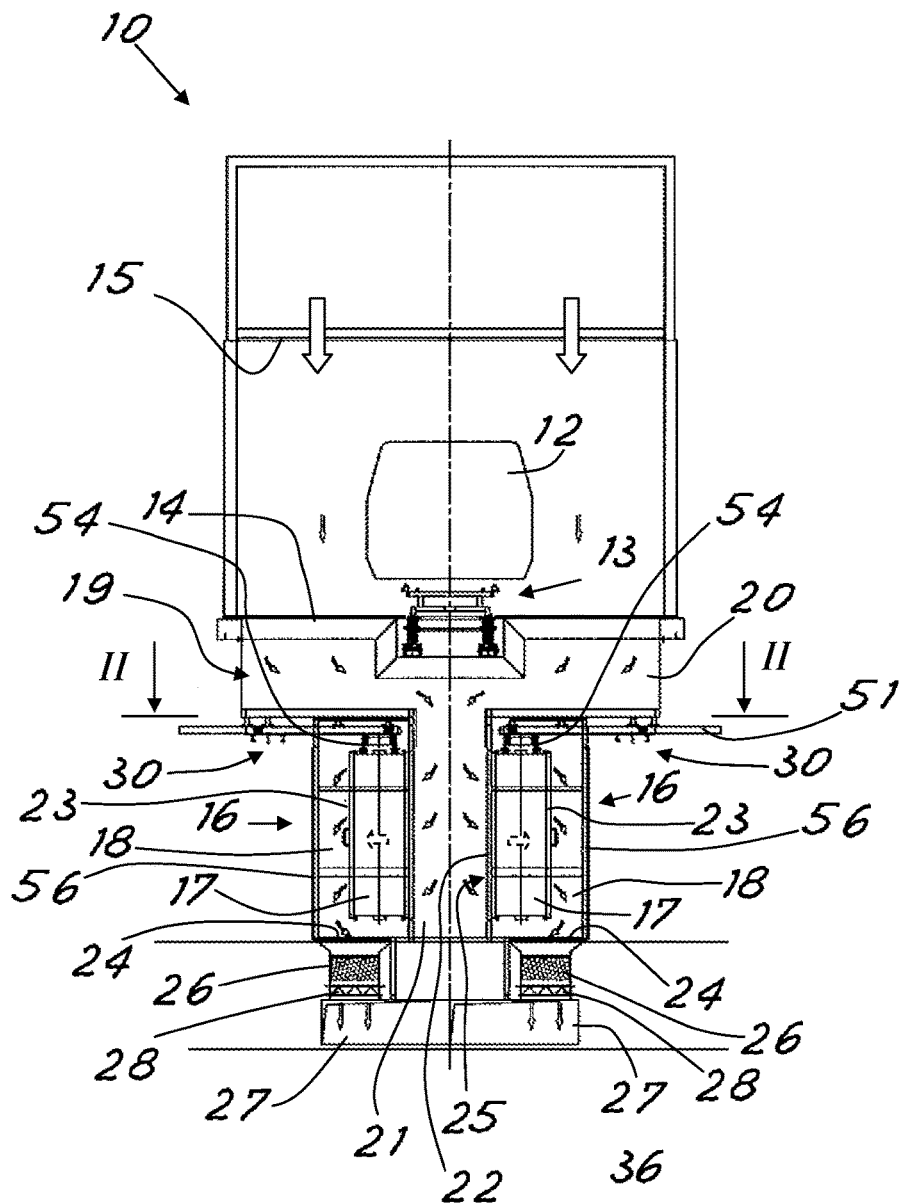
FIG. 1 shows a partially sectioned schematic elevation view of a booth according to the invention.

With reference to the figures, FIG. 1 shows a paint-spraying booth according to the invention, denoted generally by 10.

The booth comprises a chamber 11 for spraying objects 12 (for example motor vehicle bodies). The objects to be sprayed are advantageously transported into the chamber 11 by means of a known sequential conveyor system 13.

The chamber 11 is provided with known paint-spraying devices (not shown) which are operated so as to spray the paint onto the surfaces of the object to be painted. Advantageously, the paint-spraying devices may be realized in the form of known robot arms provided with spray guns.

Air for evacuation of the overspray from the chamber 11 is circulated inside the booth. For example, suitable air circulation fans (not shown) are advantageously provided according to a technique known per se for producing a continuous flow of air through the chamber.

Advantageously, for circulation of the air flow, the floor 14 of the chamber 11 is composed of grilles through which the chamber air is drawn. The ceiling of the chamber is therefore provided with corresponding air inlets 15 so as to have a continuous air flow which passes vertically through the chamber from the top downwards during the paint-spraying operations.

The air flow leaving the chamber 11 is conveyed to at least one filter unit 16 which retains the overspray. The filter unit comprises advantageously a plurality of replaceable filter modules 17, each accommodated inside an associated housing 18 which forms a seat for the filter module and which connects it between the inlet for the air from the chamber and the outlet for discharging the air after filtering.

In particular, advantageously a passage 21 for allowing air to enter the filters and an outlet 24 in each housing 18 are provided.

In the embodiment shown in FIG. 1, the filter units are advantageously two in number, being arranged facing each other in a mirror-image layout relative to a vertical midplane of the booth. Advantageously this plane is parallel to the direction of movement of the transportation system 13 which defines the direction of longitudinal extension of the booth.

In the booth embodiment where the air is drawn through the floor 14, the filter unit or units 16 are preferably arranged directly underneath the floor 14.

In the embodiment shown there is advantageously a chamber 19 having a cross-section generally in the form of a T for defining an upper header 20 extending horizontally underneath the floor 14 in order to receive air therefrom and with the vertical portion of the T which forms the passage 21 extending along the filter modules for allowing entry of the air into the filters. Inside the passage 21 the inlets 22 of the filter modules present in the respective housings 18 provided with suitable openings 25 are arranged alongside each other.

The outlets 23 of the filter modules in the respective housings 18 communicate in turn with the chamber formed by the housing 18 and connected to the outlet 24 (preferably at the bottom of the housing).

In the embodiment shown, the filter modules have advantageously a parallelepiped form with inlet and outlet arranged on opposite sides. The filters may be of various suitable types, for example also of the disposable type made of cardboard.

The outlet 24 of each housing 18 is advantageously connected (preferably via one or more further filters 26, for example of the "pocket" type) to a duct 27 for evacuation of the air from the booth. The duct 27 may definitively evacuate the air externally and/or convey it back into the chamber 11 for recycling of purified air.

Again advantageously, the outlet 24 of the housings is provided with controlled gates 28 for throttling and/or closing the air flow leaving the filter modules.

In FIG. 1, the air flow into the booth is indicated schematically by means of the arrows. From the bottom of the chamber 11 the air passes into the passage 21, being then introduced in parallel into all the filter modules. After passing into each module, the air enters into the housing 18 (each advantageously in the form of a box-like cabinet) and exits from the outlet 24 so as to reach the evacuation duct 27.

Figure 2:
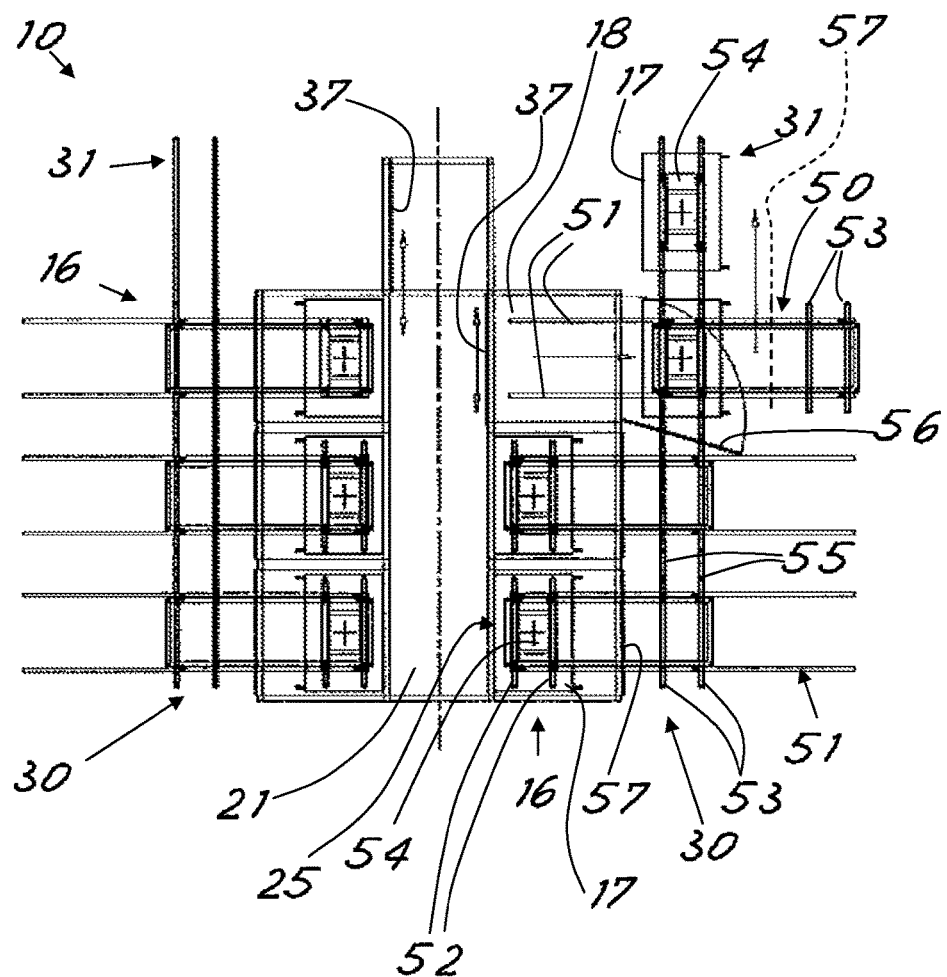
FIG. 2 shows a schematic plan view of the booth sectioned along the line II-II of FIG. 1.

As can be seen clearly also in FIG. 2, the booth according to the invention comprises a rail system 30 for extracting and transporting each filter module 17 of the plurality between its housing 18 and a zone 31 for entry/exit of the filter modules into/from the booth.

Advantageously, the rail system is of the aerial type and comprises for each housing 18 an extractable frame 50 which slides on guides 51 (preferably of the aerial type). The extractable frame in turn comprises a first pair of rail sections 52 and a second pair of rail sections 53. Both the pairs extend in the horizontal direction transversely with respect to the direction of extraction of the frame on the guides 51.

The first pair 52 is intended to be accommodated inside the housing 18 and supports a carriage 54 from which the filter module 17 is hung. The second pair instead remains outside of the housing.

As can be clearly seen in FIG. 2, the pairs of rail sections of a same frame 50 are spaced from each other so that, when the frame 50 is in the engaged or operative position (for example lower down in FIG. 2), the first pair of sections 52 is inserted inside the corresponding housing 18 so as to bring the corresponding filter module 17 into the operative position, while the second pair of sections 53 is aligned with fixed sections 55 so as to provide (together with pairs of sections of the other booth frames 50) a complete external rail track directed towards the loading/unloading zone 31.

Similarly, when the frame is extracted (as can be seen for example at the top on the right in FIG. 2) the first pair of sections 52 is aligned with the fixed sections 55 so as to provide (together with pairs of sections of the other booth frames 50) a complete external rail track directed towards the entry/exit zone 31.

In this way, the first and second pairs of rail sections of the extractable frames form alternatively rail track sections for movement of a filter module between the corresponding extractable frame and the entry/exit zone.

For extraction of the frame, each housing also comprises an associated door 56 which is air-tight when closed. The door 56 may be a door hinged in a respective housing, as shown at the top in FIG. 2, or may also be a partition 57 (shown in broken lines in FIG. 2) mounted between the pairs of rails so as to move together with the frame between the engaged operative position and extracted position, which correspond respectively to the partition position which closes the housing or which opens it.

The side for entry of the air into the housings 18 (namely the inlet openings 25 of the housings) is also provided with means for closing the opening for entry of the air into the filter modules. Advantageously, these means comprise a movable partition 37 (advantageously motorized by means known per se and therefore not shown, for example a chain drive system) which travels along the passage so as to move between a rest position (shown at the top on the left in FIG. 2) and operative positions in each of which it closes one of the openings for entry into the filter modules. In this way, when it is required to replace a filter module, the partition is displaced so as to close the air inlet into this module and the module is then extracted from the housing by sliding the frame 50 outwards on its guides 51.

Advantageously, also, the outlet 24 for the air from the housing is closed by means of the gates 28. In this way, the housing to be replaced may be completely isolated from the air flow of the booth and operation of the booth is not disturbed.

Once the extracted module has its rail sections 52 aligned with the fixed sections 55, the filter module may be slid with its carriage 54 along the rails as far as the zone 31, where it may be removed for cleaning or disposal if necessary.

A new module may then be inserted on the rails and transported as far as the empty housing so as to be introduced into the housing with a procedure the reverse of that described above for extraction.

The modules may be moved from and to the entry/exit zone 31 for example by means of a suitable known elevator or conveyor, not shown, which picks them up for example from a store. Advantageously, in the case of compatible filters, for example made of cardboard, the entry/exit zone may also comprise a suitable compactor device, of the type known per se, for used modules.

The filter modules have advantageously the inlet side which sealingly adheres with its edge against a circumferential edge 36 of the communication opening 25 between the housing 18 and the entry passage 21. In this way, it is sufficient to rest the filter against the edge 36 to ensure the air tightness and the circulation through the filter of the air flow from the paint-spraying chamber. The sealed contact may be ensured, for example, by a thrusting force exerted on the module by the door or the frame in the closed or operative position or further known constraining means may be provided and operated to keep the module in the operative position.

Figure 3:
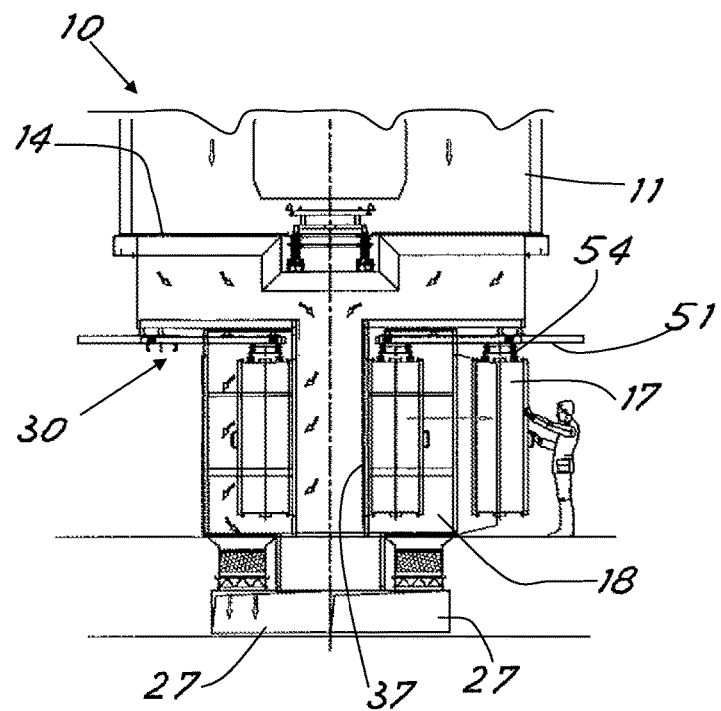
FIG. 3 shows an enlarged partial schematic view of the booth according to FIG. 1 during a filter changing operation.

FIG. 3 shows in greater detail a sectioned elevation view of the operation for extraction and changing of a filter module 17 by an operator.

Figure 4:
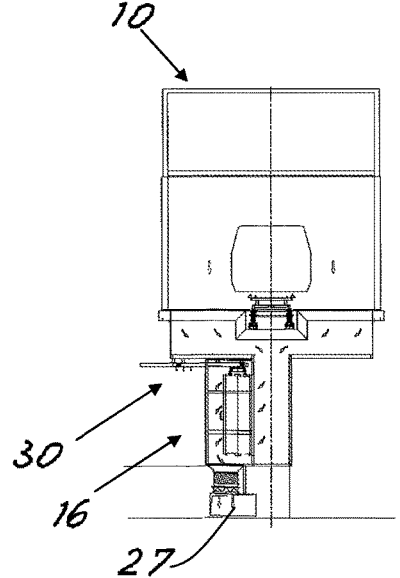
FIG. 4 shows a schematic view, similar to that of FIG. 1, showing a possible variation of embodiment of a booth according to the invention.

Although the embodiment with two filter units in a mirror-image arrangement has been found to be particularly advantageous it is nevertheless also possible to use a single filter unit for example when the air flow to be treated is more limited. This is shown for example in FIG. 4 where essentially the T-shaped chamber for conveying the air to the filters has filter modules on one side only of the entry passage and therefore is provided with a single filter transportation and movement system. As regards the rest the structure of the paint-spraying booth may be identical to that described above.

At this point it is clear how the predefined objects have been achieved. With a booth according to the invention it is possible to replace the filters cyclically in a easy and rapid without even having to stop the plant. Since the air flow is divided up by means of the plurality of filters, closing of one filter for removal and replacement thereof does not reduce excessively the air flow for the time needed for the whole operation. Owing to the rail system, the operator is able to perform the changing operations more easily and with less effort.

The movement system, however, is simple, strong and relatively low-cost.

Obviously the description above of an embodiment applying the innovative principles of the present invention is provided by way of example of these innovative principles and must therefore not be regarded as limiting the scope of the rights claimed herein.

For example, as may be now easily imagined by the person skilled in the art, the entry/exit zone may be divided into an entry zone where the new filters arrive and an exit zone where the used filters are transferred. These zones may be for example at the two opposite ends of the movement track formed by the sections 52 or 53 and 55.

The movement system may also be automatic or semi-automatic. For example, it may be advantageous to design the frames 50 so that they are motorized for their controlled movement between engaged or operative position and extracted position.

Changing of the filters may be performed cyclically at programmed times following a given operating period or suitable sensors may also be provided, said sensors requesting changing of a filter when it is detected as being clogged up by more than a certain amount. During a complete changing operation, the filter modules may also be sequentially replaced one at a time (or in pairs, in the case of two filter units with associated independent automated systems), until all the filter modules have been completely replaced. The paint-spraying booth may thus be kept operative for the whole time period needed for replacement.

In the case of disposable filters made of combustible material a method for high-temperature incineration of the used filters may be envisaged, said method using at least partly as fuel the filter itself and the paint contained in it. In addition to eliminating the filters it is possible to make advantageous use of the combustion for heat recovery from the combustion fumes.

The invention claimed is:

1. A paint-spraying booth, comprising:
a paint-spraying chamber;
at least one filter unit; and
a rail system;
wherein paint is sprayed in the paint-spraying chamber,
wherein the paint-spraying chamber is provided with air flow for evacuation of paint overspray which is conveyed to the at least one filter unit of the paint-spraying booth for filtering and separating the paint overspray from the air flow,
wherein the at least one filter unit comprises a plurality of replaceable filter modules,
wherein each of the filter modules is removably contained inside one of a plurality of housings of the at least one filter unit,
wherein the rail system is configured to remove and transport each of the filter modules between the one of the plurality of housings of the at least one filter unit and a zone for entry/exit of the filter modules into/from the paint-spraying booth,
wherein the rail system comprises, for each housing of the plurality of housings, an extractable frame movable between an operative position, engaged inside the respective housing, and an extracted position,
wherein the frame comprises a first pair of rail sections configured to support a carriage from which a corresponding one of the filter modules is hung,
wherein the first pair of rail sections is configured to be accommodated inside the respective housing when the frame is in the operative position,
wherein the rail system comprises a second pair of rail sections, spaced from the first pair of rail sections in a direction of extraction of the frame,
wherein the first and second pairs of rail sections extend in a horizontal direction transversely with respect to the direction of extraction of the frame,
wherein the second pair of rail sections is configured to remain outside the respective housing when the frame is in the operative position, and
wherein the first and second pairs of rail sections form portions of a track for movement of one of the filter modules between a corresponding frame and the zone for entry/exit.

2. The booth of claim 1, wherein each of the plurality of housings has a first inlet for air arriving from the paint-spraying chamber, to which a corresponding inlet of one of the filter modules is connected when the one of the filter modules is in an operative position inside the respective housing, and
wherein a controlled mechanism is provided for closing the first inlet when the one of the filter modules is extracted from the respective housing.

3. The booth of claim 2, wherein the controlled mechanism comprises a movable partition configured to slide so as to move between a rest position and operating positions, in each of which the movable partition closes the first inlet of one of the plurality of housings.

4. The booth of claim 2, wherein each of the plurality of housings has an associated outlet for the air flow after the air flow has passed into the one of the filter modules inside the respective housing, and
wherein controlled gates are provided for controllably closing the associated outlet.

5. The booth of claim 2, wherein the first inlets of the plurality of housings are provided inside a common passage where the air flow from the paint-spraying chamber arrives.

6. The booth of claim 1, wherein the at least one filter unit comprises two filter units, and
wherein the two filter units are arranged in a mirror-image layout underneath a floor of the paint-spraying chamber.

7. The booth of claim 1, wherein a chamber with a T-shaped cross-section is provided underneath a floor of the paint-spraying chamber,
wherein a horizontal part of the T-shaped cross-section is configured to form a first duct for conveying the air flow which passes through the floor of the paint-spraying chamber, and
wherein a vertical part of the T-shaped cross-section is configured to form a second duct, inside which inlets of the filter modules emerge.

8. The booth of claim 1, further comprising:
further filters downstream of the filter modules.

9. A paint-spraying booth, comprising:
a paint-spraying chamber;
at least one filter unit; and
a rail system;
wherein paint is sprayed in the paint-spraying chamber,
wherein the paint-spraying chamber is provided with air flow for evacuation of paint overspray which is conveyed to the at least one filter unit of the paint-spraying booth for filtering and separating the paint overspray from the air flow,
wherein the at least one filter unit comprises a plurality of replaceable filter modules,
wherein each of the filter modules is removably contained inside one of a plurality of housings of the at least one filter unit,
wherein the rail system is configured to remove and transport each of the filter modules between the one of the plurality of housings of the at least one filter unit and a zone for entry/exit of the filter modules into/from the paint-spraying booth, wherein the rail system comprises, for each housing of the plurality of housings, an frame movable between an operative position, engaged inside the respective housing, and an extracted position, wherein the frame comprises a first pair of rail sections and a second pair of rail sections spaced from the first pair of rail sections in a direction of extraction of the frame, wherein the first and second pairs of rail sections extend in a horizontal direction transversely with respect to the direction of extraction of the frame, wherein the first pair of rail sections is configured to support a carriage from which a corresponding one of the filter modules is hung, wherein when the frame is in the extracted position, the first pair of rail sections is configured to form portions of a track for movement of the corresponding one of the filter modules between the zone for entry/exit and the first pair of rail sections, and wherein when the frame is in the operative position, the first pair of rail sections is configured to hold the corresponding one of the filter modules in position to receive at least a portion of the air flow for the evacuation of the paint overspray.

10. The booth of claim 9, wherein each of the plurality of housings has a first inlet for air arriving from the paint-spraying chamber, to which a corresponding inlet of one of the filter modules is connected when the one of the filter modules is in an operative position inside the respective housing, and wherein a controlled mechanism is provided for closing the first inlet when the one of the filter modules is extracted from the respective housing.

11. The booth of claim 10, wherein the controlled mechanism comprises a movable partition configured to slide so as to move between a rest position and operating positions, in each of which the movable partition closes the first inlet of one of the plurality of housings.

12. The booth of claim 10, wherein each of the plurality of housings has an associated outlet for the air flow after the air flow has passed into the one of the filter modules inside the respective housing, and wherein controlled gates are provided for controllably closing the associated outlet.

13. The booth of claim 10, wherein the first inlets of the plurality of housings are provided inside a common passage where the air flow from the paint-spraying chamber arrives.

14. The booth of claim 9, wherein the at least one filter unit comprises two filter units, and wherein the two filter units are arranged in a mirror-image layout underneath a floor of the paint-spraying chamber.

15. A paint-spraying booth, comprising:
a paint-spraying chamber;
at least one filter unit; and
a rail system;
wherein paint is sprayed in the paint-spraying chamber,
wherein the paint-spraying chamber is provided with air flow for evacuation of paint overspray which is conveyed to the at least one filter unit of the paint-spraying booth for filtering and separating the paint overspray from the air flow, wherein the at least one filter unit comprises a plurality of replaceable filter modules, wherein each of the filter modules is removably contained inside one of a plurality of housings of the at least one filter unit, wherein the rail system is configured to remove and transport each of the filter modules between the one of the plurality of housings of the at least one filter unit and a zone for entry/exit of the filter modules into/from the paint-spraying booth, wherein the rail system comprises, for each housing of the plurality of housings, an frame movable between an operative position, engaged inside the respective housing, and an extracted position, wherein the frame comprises a first pair of rail sections and a second pair of rail sections spaced from the first pair of rail sections in a direction of extraction of the frame, wherein the first and second pairs of rail sections extend in a horizontal direction transversely with respect to the direction of extraction of the frame, wherein the first and second pairs of rail sections are configured to support a carriage from which a corresponding one of the filter modules is hung, wherein when the frame is in the extracted position, the first pair of rail sections is configured to form portions of a track for movement of one of the filter modules between a corresponding frame and the zone for entry/exit, and wherein when the frame is in the operative position, the second pair of rail sections is configured to form the portions of the track for the movement of the one of the filter modules between the corresponding frame and the zone for entry/exit.

16. The booth of claim 15, wherein each of the plurality of housings has a first inlet for air arriving from the paint-spraying chamber, to which a corresponding inlet of one of the filter modules is connected when the one of the filter modules is in an operative position inside the respective housing, and wherein a controlled mechanism is provided for closing the first inlet when the one of the filter modules is extracted from the respective housing.

17. The booth of claim 16, wherein the controlled mechanism comprises a movable partition configured to slide so as to move between a rest position and operating positions, in each of which the movable partition closes the first inlet of one of the plurality of housings.

18. The booth of claim 16, wherein each of the plurality of housings has an associated outlet for the air flow after the air flow has passed into the one of the filter modules inside the respective housing, and wherein controlled gates are provided for controllably closing the associated outlet.

19. The booth of claim 16, wherein the first inlets of the plurality of housings are provided inside a common passage where the air flow from the paint-spraying chamber arrives.

20. The booth of claim 15, wherein the at least one filter unit comprises two filter units, and wherein the two filter units are arranged in a mirror-image layout underneath a floor of the paint-spraying chamber.

* * * * *